United States Patent Office 3,027,262
Patented Mar. 27, 1962

3,027,262
IN-CAN BAKING PROCESS AND PRODUCT
Herbert S. Polin, Rio de Janeiro, Brazil, assignor to Vacuum Baking Corporation, New York, N.Y., a corporation of Pennsylvania
No Drawing. Filed Mar. 5, 1956, Ser. No. 569,238
7 Claims. (Cl. 99—172)

This invention relates to an in-can baking process and the product produced therefrom. More particularly, it relates to a relationship between ingredients used to make an in-can baked product whereby reproducibility of the baked product in various sizes of in-can baking containers is effected.

The making of in-can baked products is a relatively new art. A batter or dough composition is first prepared by mixing and blending various baking ingredients. After the batter or dough has been made, it is scaled into cans previously treated with a releasing compound. Alternatively, the releasing compound may be included in the batter composition as described in my co-pending application, Serial Number 521,627, filed July 12, 1955. The cans are then lidded and partially sealed so as to allow for escape of the gases which occur during the baking cycle. Baking is done either continuously or in a cyclic step for a desired period of time at a specified temperature. Immediately after the dough or batter is baked, the partially sealed cans are hermetically sealed and then cooled at a desired rate to a desired temperature to produce the finished in-can baked product.

Heretofore, bakery products manufactured by in-can baking processes have had dimensions, particularly in height, which only fortuitously filled the can to its limit and likewise only fortuitously did not show compression defects or cracking or other demerits in appearance and quality.

Any baked product has a finished density determined by a relationship between the constituents of its composition, the time and temperature of baking, and its cooling rate. It is frequently found that a finished bakery product, such as cake, may have throughout several zones of varying density. This variation in density at different points within the baked product results from the action of gaseous expansion as the constituents forming the cake are heat processed, for example, evolution of gases from the carbonate, eggs, and other cake-making ingredients, and from the points of compression as the dough mass reaches the limits of the container. While the mass is still plastic, it is susceptible to shock, which can destroy the characteristic texture of the cake thereby eliminating the desirable airiness and lightness. Such shock causes collapse of all or part of the cake. The shock may, of course, be thermal or mechanical or a combination of both, and the cake, unable to support the weight of the mass at a point beyond its plastic limit, settles and collapses. To a greater or less degree, every cake has a change in dimension during its cooling cycle, and the acceptable or desirable cake is that which suffers the least change. Baking done at home, or by conventional industrial processes not involving a canning operation, does not subject the baked product to the varied shock stresses attending in-can baking. From the start of the operation the cans are handled by machinery which is striking, spinning, rolling, bumping and dropping the sensitive contents through the steps of the process, while at one point, the baked product as it issues from the oven at 350° F., is cooled in a water spray at approximately 60° F. Only in-can baking imposes such shock upon the product and conventional baking formulations are found to be deficient in their ability to resist the described treatment.

Heretofore, preparation of the batter of dough for in-can baking has followed the customary baker's formulation, without regard to the ratio relationship between the various ingredients to develop a reproducible baked product, with the result that in-can baked products prepared from such batters and doughs, when scaled, only fortuitously filled the can to its limits at the conclusion of the production cycle, and when baked and cooled, only fortuitously did not show compression defects or cracking or other demerits in appearance and quality. Furthermore, when changing from one can size to another, with simple weight relationships followed, the baked products prepared from scaled batters and doughs showed variations in texture. It has been obvious, therefore, that customary baker's formulations that have been used in the in-can baking field do not yield a reproducible product. Neglect of ratio in a batchwise system of formulation of the batter has impeded the development of continuous baking and does not achieve the uniformity so necessary in a final product which is concealed from the view of the manufacturer.

In order to overcome the above mentioned disadvantages, this invention contemplates the use of a ratio or balance of constituents within specified limits that are critical, to prepare a batter which, when processed through an in-can baking and cooling cycle, will produce a cake that is highly resistant to thermal and mechanical shock during the handling, baking and cooling thereof. By following the teachings of this invention, a reproducible bakery product can be produced which will completely fill the can in which it is baked and which will show no defects in appearance and quality after passing through an in-can baking process.

High resistance to thermal and mechanical shock is a requirement of importance in factory production where thousands of cans of product are handled hourly by automatic means, which imposes shock upon the hot and plastic mass, and where rapid cooling is necessary for achieving the vacuum and thus obtaining a product having a long shelf-life. The balance of constitutents within critical limits, set forth in this invention, provides a cake mass that sets during the baking cycle and thus the plasticity of the hot cake at the end of its baking period is sharply limited. This resistance of the product to thermal and mechanical shock and reduction of plasticity before cooling gives a completely reproducible product having uniform texture and size. Therefore, regardless of the volumetric capacity of the can, a metered amount of batter of the balanced formulation of this invention will fill a can to the desired volume each and every time.

The object of this invention is to provide the parameters by which an in-can baked product will completely fill a can of any dimension.

Another object is to provide a weight relationship between the baking ingredients used to form an in-can baked product so that reproducibility is accomplished when a batter or dough formed from the ingredients is scaled to various can sizes.

Still a further object is to provide an in-can baked product formulation which will produce a reproducibly uniform baked product having uniform texture and density and showing no defects in appearance and quality.

A further object is to provide a bakery formulation which will fill a desired can size and will not collapse under mechanical and thermal shock.

The manner in which these and other objects of the invention are attained will become apparent from the following description which is intended to be illustrative rather than limitative.

According to the present invention, it has been discovered that a specific relationship of the total water to flour and milk solids to the sum total of sugar, shortening and egg solids, all on a weight basis brings about a reproducible formulation which can be used for various can sizes. It has been found that this relationship is about 1 to 1.2 to 2. For example, one part by weight of water (including that present in milk or eggs), to one and two tenths parts by weight of whatever flour mixture is called for by the cake under production (plus 1 percent of the flour weight of baking powder), to two parts by weight of sugar, shortening and egg solids were mixed together, with salt and flavoring added, for the required period of time to produce a cake formulation. Twelve and one-quarter ounces of the raw cake formulation was scaled and placed in a can that had been prepared for in-can baking by spraying the inner surface thereof with a release coating compound. A lid was placed on the can and the can was partially sealed so that gases evolving during the baking of the cake could escape. The partially sealed can with the formulation therein was then placed in an oven maintained at a temperature of about 340° to 380° F. for a period of approximately fifty minutes. After baking, the can containing the baked product was immediately hermetically sealed and cooled to the desired temperature to produce the in-can baked product. The in-can baked cake so produced was allowed to stand for several days and upon opening the can, a thin golden brown, uniform crust was found on the fresh cake, which properly filled the can and had no crown. Upon cutting the cake into several slices, it was found that the texture was even throughout and the cake had the requisite density throughout.

To better understand the ratios which have been found to be optimum in the above formula, the composition of an average pound cake will be discussed. Traditional pound cake, which derives its name from the blend of components in the proportions of one pound of flour, one pound of butter or shortening, one pound of sugar, and one pound of eggs will serve as a comparison. The liquid necessary for the composition and moisture in this recipe is that found in the non-solid portion of the whole eggs. Whole eggs contain, on the average, 25% solids. The proportions of this composition then are:

Water _____ 0.75
Flour _____ 1.00
Sugar, shortening and egg solids_____ 2.25

Relating these values to each other, it is found that a formula of 1 to 1.35 to 3 is used. Batter prepared from this formulation, properly scaled to a particular can size for processing through an in-can baking cycle, will not fill the can, although it will be of proper weight, because during the baking cycle, the batter will rise to the top of the can but will collapse during partial cooling and the final product will be too short for the can, thus having a poor volumetric relationship in respect to the size of the can. Furthermore, the solids content, being high in proportion to the liquid, produces a stiff batter which, during baking has too little fluidity to accommodate differential thermal stresses, particularly at the top. The cake will therefore exhibit a crown-like cap and will be cracked and exaggeratedly crusty around the periphery of this crown. This is a characteristic defect which only critical proportioning of ingredients will resolve.

The limited moisture in a cake is concentrated in the center of the baked mass and it is at this point that the cake has maximum plasticity when it is removed from the oven at the conclusion of the baking cycle.

It must be understood that the importance of this finding is directly related to in-can baked products and is of very much less significance in conventional baking practice in which cakes and other products are subjected to heat without covers and in which no special volumetric considerations are involved.

The density and rising characteristics of the finished formulation prepared from the formula relationships of this invention are such that the following scaled quantities of the formulation may be used for the following standard can sizes:

| Can Size | Raw Formulation Weight, oz. | Minimum Net Weight, oz. |
|---|---|---|
| 401 x 411 | 12.25 | 12.0 |
| 307 x 409 | 8.0 | 7.7 |
| 300 x 308 | 4.7 | 4.5 |
| 300 x 200 | 2.3 | 2.2 |

Larger cans exhibit moisture loss during baking of approximately 2 percent during a baking cycle proportioned to the batter content.

Literally hundreds of recipes for pound cake are available in the literature, but only fortuitously do some of them approximate the relationships which, by the teaching of this application, can be used to proportion an in-can baked product to exactly fill its container after cooling.

While the relationships of this invention are significant for the purposes described under any and all mixing cycles, a preferred cycle and mixing time is the following:

*Stage I*

(a) Blend the total of dry ingredients with 50% of the eggs and 100% of the water (or milk) called for by the formula.
(b) After preliminary blending, mix for seven (7) minutes at a paddle speed of 180 revolutions per minute.

*Stage II*

(a) Add the balance of eggs to the preliminarily mixed batch.
(b) Add desired flavoring.
(c) Stir for three (3) minutes at a paddle speed of 100 revolutions per minute.

Pound cakes by definition may refer to a broad class of bakery products characterized by a somewhat dense, closely grained structure, made with whole eggs, egg whites, egg yolks, or a combination of these. They may be flavored with a variety of substances and yield cakes called by the flavor designation rather than pound cakes.

Such flavors may be chocolate (as a flavor blended throughout the composition or in streaks to fashion the so-called marble cake), nutmeg, cinnamon, nuts, peanut butter, butterscotch, lemon, orange, etc.

It is believed that the technical significance of the formula which limits the proportions as described is due to the preservation of a fluidity which fosters homogeneity of the batter throughout the baking cycle. The external crust is thin and no capping occurs. The elimination of the cap means that the density at the top of the cake is identical with that in the center and the whole mass is essentially self-supporting in the critical plastic stage at the end of the baking cycle. The thermal shock of cooling merely stiffens the mass to its permanent dimension.

It has been found that the formula of this invention may depart in each of the relationships established by a factor of about 15 percent in any category or categories and still yield a formulation having substantially the characteristics described above. While optimum satisfaction resides in precisely the relationship of 1 to 1.2 to 2, slight variations therefrom will produce a desired formulation for in-can baking. It will be appreciated that, in controlling production where continuous or semi-continuous baking takes place, slight shifts in oven temperature, positioning of a small batch of product within a large oven, and stratification of mixing ingredients during the mixing cycle all tend to influence the character of the finished products. Thus, it must be realized that the precise relationships are to be interpreted as a laboratory produced perfection from which it has been found that a departure by about 15 percent will not, under evaluation of production conditions, yield a mass product which would be reasonably distinguished from that of the perfectly produced laboratory specimens where every element is under precision control.

It is to be understood that, although the invention has been disclosed using a can for baking the in-can baked product, any volumetric container can be used which will provide a partitally sealed baking vessel which may be hermetically sealed after baking.

It is to be further understood that the invention herein described is limited only to the scope of the appended claims and various changes may be made without departing from the invention or sacrificing any advantages thereof.

What is claimed is:

1. In the process for making an in-can baked product comprising preparing a formulation containing a 1 to 1.2 to 2 weight ratio of water to flour and milk solids to shortening, sugar and egg solids; scaling said formulation; placing the scaled formulation in a can; lidding said can to effect partial sealing thereof; subjecting said formulation in the partially sealed can to a baking cycle to effect baking of said formulation; hermetically sealing the baked product in said can immediately following the baking cycle; and cooling said hermetically sealed can.

2. The process for making an in-can baked product claimed in claim 1 in which the scaled formulation has a releasing means incorporated therewith.

3. The process for making an in-can baked product claimed in claim 1 in which any component of the stated weight ratio may vary by about 15 percent.

4. The process for making an in-can baked product claimed in claim 2 in which the formulation has added thereto flavoring and other baking ingredients.

5. An in-can baked product made from a formulation comprising essentially about one part by weight of water, about one and two-tenths part by weight of flour and milk solids, and about two parts by weight of shortening, sugar and egg solids.

6. An in-can baked product as claimed in claim 5 in which any component of the stated weight ratio may vary by about 15 percent.

7. An in-can baked product as claimed in claim 5 in which the formulation has added thereto flavoring and other baking ingredients.

References Cited in the file of this patent

Military Specification, Pound Cake, Canned, MIL-P-3234-A, September 22, 1952, pp. 2-5.